United States Patent
Vastag

(10) Patent No.: US 6,178,729 B1
(45) Date of Patent: Jan. 30, 2001

(54) LAWN MOWER WITH A DECK FORMED WITH A TRAP DOOR

(76) Inventor: Laszlo Vastag, Road 1, Box 135 A, Stamford, NY (US) 12167

(*) Notice: Under 35 U.S.C. 154(b), the term of this patent shall be extended for 0 days.

(21) Appl. No.: 09/289,047

(22) Filed: Apr. 9, 1999

(51) Int. Cl.[7] .......................... A01D 34/03; A01D 34/43; A01D 34/64
(52) U.S. Cl. .................. 56/17.5; 56/255; 56/295
(58) Field of Search ..................... 56/17.5, 17.3, 56/17.2, 13.1, 11.3, 16.9, 17.4, 12.1, DIG. 20, DIG. 24, DIG. 9, 256, 255, 320.1, 320.2, 295, 12.7

(56) References Cited

U.S. PATENT DOCUMENTS

| | | | |
|---|---|---|---|
| Re. 29,139 | * | 2/1977 | Messner ................................ 56/13.1 |
| Re. 32,202 | * | 7/1986 | Cody et al. ............................ 56/11.3 |
| Re. 32,730 | * | 8/1988 | Wick ..................................... 56/11.3 |
| 2,578,880 | * | 12/1951 | Doyle .................................... 56/17.2 |
| 3,715,875 | * | 2/1973 | Brucker ................................ 56/320.1 |
| 3,851,452 | * | 12/1974 | Brocas .................................. 56/17.4 |
| 4,037,389 | * | 7/1977 | Harkness ............................... 56/11.3 |
| 4,090,345 | * | 5/1978 | Harkness ............................... 56/10.5 |
| 4,107,901 | * | 8/1978 | Moore ................................... 56/17.5 |
| 4,122,652 | * | 10/1978 | Holtermann ........................... 56/11.3 |
| 4,306,405 | * | 12/1981 | Fleigle ................................... 56/11.3 |
| 4,378,668 | * | 4/1983 | Gullett ................................... 56/12.7 |
| 4,466,235 | * | 8/1984 | Cole ...................................... 56/16.9 |
| 4,633,658 | * | 1/1987 | Nogawa ................................ 56/255 |
| 4,641,431 | * | 2/1987 | Leming et al. ....................... 30/276 |
| 4,716,717 | * | 1/1988 | Ogano et al. ......................... 56/255 |
| 4,817,372 | * | 4/1989 | Toda et al. ............................ 56/12.8 |
| 4,854,115 | * | 8/1989 | Jones et al. ........................... 56/320.1 |
| 4,887,418 | * | 12/1989 | Pelletier ................................ 56/249.5 |
| 5,012,633 | * | 5/1991 | Ito et al. ................................ 56/12.9 |
| 5,033,595 | * | 7/1991 | Pardee ................................... 192/18 R |
| 5,048,276 | * | 9/1991 | Miller .................................... 56/16.9 |
| 5,117,616 | * | 6/1992 | McLane ................................ 56/17.5 |
| 5,231,827 | * | 8/1993 | Connolly et al. ..................... 56/13.1 |
| 5,293,731 | * | 3/1994 | Thomas et al. ....................... 56/11.3 |
| 5,305,587 | * | 4/1994 | Johnson ................................ 56/16.9 |
| 5,365,725 | * | 11/1994 | McCance .............................. 56/16.9 |
| 5,373,687 | * | 12/1994 | Secord .................................. 56/255 |
| 5,581,985 | * | 12/1996 | Secosky ................................ 56/10.3 |
| 5,884,463 | * | 12/1994 | Darzinskis ............................ 56/255 |

* cited by examiner

Primary Examiner—Robert E. Pezzuto
Assistant Examiner—Arpad Fabian Kovacs

(57) ABSTRACT

A lawn mower system includes a deck having a side wall with a vertical axis and a top wall coupled to the upper edges of the side wall and with an opened bottom. The side wall also forms an open front. Two pair of wheels are provided. Also provided is a handle having a pivotable lower end coupled with respect to the housing adjacent to the rear edge and having an upper handle area for use by the user. A motor is mounted in a central region of the deck with a rotatable drive shaft extending downwardly therefrom. A rotatable blade is mounted to the lower end of the drive shaft. A trap door has a width essentially equal to the free front upper edge of the deck with a hinge coupling the deck and trap door. The trap door has an arcuate cross-sectional orientation and is adapted to be lowered to a first orientation whereby its exterior edge is essentially at the same height as the lower edge of the deck and raised to a second orientation whereby the entire trap door is above the upper surface of the deck. The side edges of the trap door are formed in an arcuate configuration with the adjacent side wall of the deck also being in an arcuate configuration whereby when the trap is in the first orientation a generally semi-circular exhaust is formed between the deck and trap door whereby cut grass and foliage may be dispersed therethrough to exterior of the deck.

8 Claims, 4 Drawing Sheets

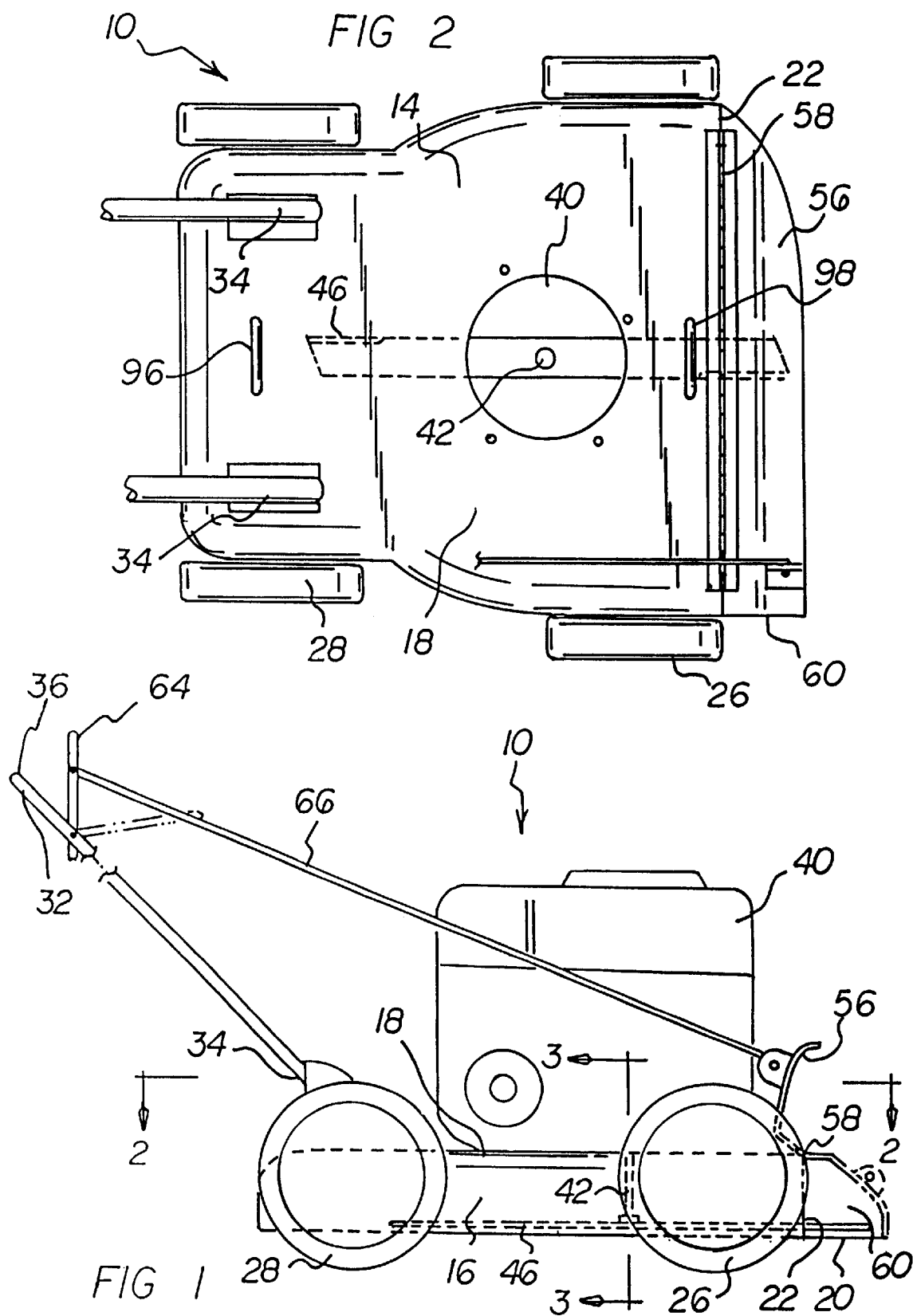

FIG 7
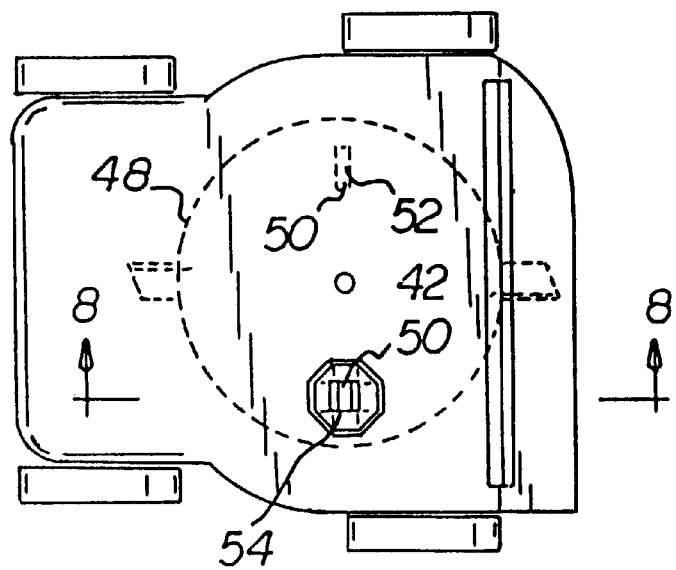
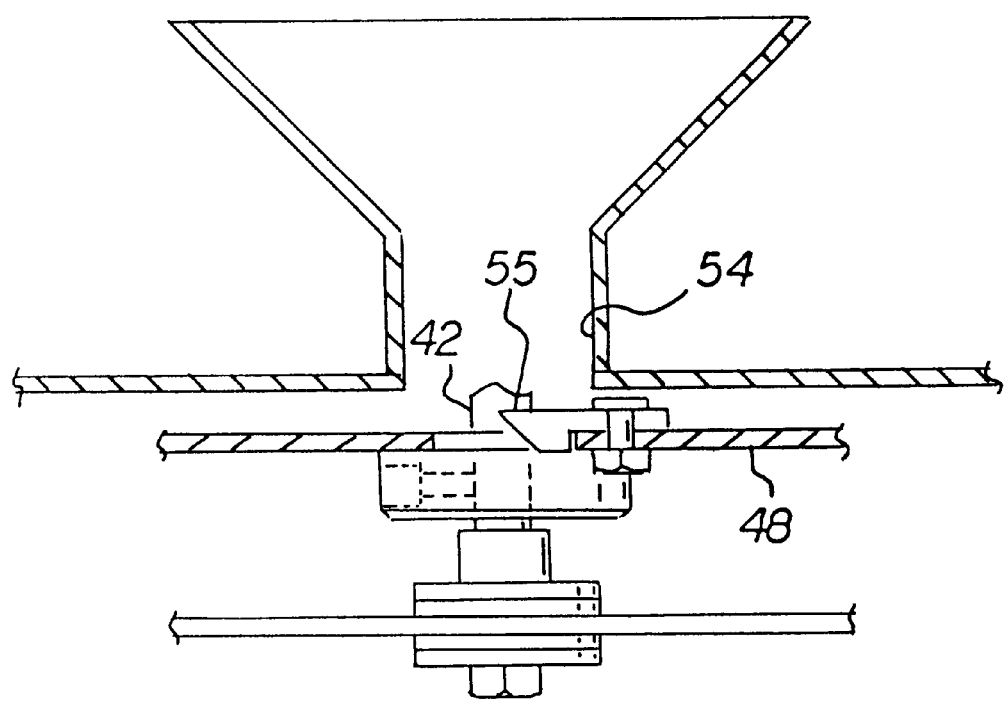
FIG 8

LAWN MOWER WITH A DECK FORMED WITH A TRAP DOOR

BACKGROUND OF THE INVENTION

1. Field of the Invention

The present invention relates to a lawn mower system with a deck formed with a trap door and more particularly pertains to cutting grass, vegetation, brush, bushes, foliage and the like with a lawn mower adapted to be configured for varying heights of material being cut at the discretion of the user and also chips larger pieces of brush and the like.

2. Description of the Prior Art

The use of lawn mowers of known designs and configurations is known in the prior art. More specifically, lawn mowers of known designs and configurations heretofore devised and utilized for the purpose of cutting grass and foliage of varying heights through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 2,578,880 to Doyle discloses a Rotating Cutting Disk type Mower. U.S. Pat. No. 4,887,418 to Pelletier discloses an Apparatus for Mowing, Chipping and Blowing. U.S. Pat. No. 4,633,658 to Nogawa discloses a Lawn Mower. U.S. Pat. No. 4,466,235 to Cole discloses a Rotary Mower. Lastly, U.S. Pat. No. 3,851,452 to Brocas discloses Guarded Rotary Mowers.

While these devices fulfill their respective, particular objectives and requirements, the aforementioned patents do not describe lawn mower system with a deck formed with a trap door as disclosed herein.

In this respect, the lawn mower system with a deck formed with a trap door according to the present invention substantially departs from the conventional concepts and designs of the prior art, and in doing so provides an apparatus primarily developed for the purpose of cutting grass and foliage with a lawn mower adapted to be configured for varying heights of grass and foliage at the discretion of the user.

Therefore, it can be appreciated that there exists a continuing need for a new and improved lawn mower system with a deck formed with a trap door which can be used for cutting grass and foliage with a lawn mower adapted to be configured for varying heights of grass and foliage at the discretion of the user and also chips larger pieces of brush and the like. In this regard, the present invention substantially fulfills this need.

SUMMARY OF THE INVENTION

In view of the foregoing disadvantages inherent in the known types of lawn mowers of known designs and configurations now present in the prior art, the present invention provides an improved lawn mower system with a deck formed with a trap door. As such, the general purpose of the present invention, which will be described subsequently in greater detail, is to provide a new and improved lawn mower system with a deck formed with a trap door and method which has all the advantages of the prior art and none of the disadvantages.

To attain this, the present invention essentially comprises a new and improved lawn mower system with a deck having a trap door in the front for cutting grass and foliage and operable as a function of the height of the grass and foliage to be cut. The system comprises, in combination, a deck having a generally cylindrical side wall with a vertical axis and a top wall coupled to the upper edges of the side wall and with an opened bottom. The side wall also forms an open front for nearly 180 degrees of its extent. Two pair of wheels are provided and include a set of front wheels generally centrally located on opposite sides of the side wall and extending outwardly therefrom and a pair of rear wheels extending outwardly from adjacent to the rear edge of the side wall. Also provided is a handle having a pivotable lower end coupled with respect to the housing adjacent to the rear edge and having an upper handle area for use by the user. A motor is mounted in a central region of the deck with a rotatable drive shaft extending downwardly therefrom. A rotatable blade is mounted to the lower end of the drive shaft with a supplemental cutter wheel in a circular configuration located between the upper surface of the deck and the lower end of the drive shaft, the wheel having a pair of diametrically opposed apertures with cutting edges formed therein. An opening is located in the top wall adapted to receive material therethrough for being cut and chopped by the cutting edges of the wheels. A trap door in the system has a width essentially equal to the free front upper edge of the deck with a hinge coupling the deck and trap door, the trap door having an arcuate cross-sectional orientation and adapted to be lowered to a first orientation whereby its exterior edge is essentially at the same height as the lower edge of the deck and raised to a second orientation whereby the entire trap door is above the upper surface of the deck, the side edges of the trap door being formed in an arcuate configuration with the adjacent side wall of the deck also being in an arcuate configuration whereby when the trap is in the first orientation a generally semi-circular exhaust is formed between the deck and trap door whereby cut grass and foliage may be dispersed therethrough to exterior of the deck. Lastly provided in the system is a trigger mounted on the handle coupled to the trap door for pivoting the trap door between the raised position and the lower position when in operation and use. There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lawn mower system with a deck formed with a trap door which has all of the advantages of the prior art lawn mowers of known designs and configurations and none of the disadvantages.

It is another object of the present invention to provide a new and improved lawn mower system with a deck formed with a trap door which may be easily and efficiently manufactured and marketed.

It is further object of the present invention to provide a new and improved lawn mower system with a deck formed with a trap door which is of durable and reliable constructions.

An even further object of the present invention is to provide a new and improved lawn mower system with a deck formed with a trap door which is susceptible of a low cost of manufacture with regard to both materials and labor, and which accordingly is then susceptible of low prices of sale to the consuming public, thereby making such lawn mower system with a deck formed with a trap door economically available to the buying public.

Even still another object of the present invention is to provide a lawn mower system with a deck formed with a trap door for cutting grass and foliage with a lawn mower system.

Lastly, it is an object of the present invention to provide a new and improved lawn mower system. The system includes a deck having a side wall with a vertical axis and a top wall coupled to the upper edges of the side wall and with an opened bottom. The side wall also forms an open front. Two pair of wheels are provided. Also provided is a handle having a pivotable lower end coupled with respect to the housing adjacent to the rear edge and having an upper handle area for use by the user. A motor is mounted in a central region of the deck with a rotatable drive shaft extending downwardly therefrom. A rotatable blade is mounted to the lower end of the drive shaft. A trap door has a width essentially equal to the free front upper edge of the deck with a hinge coupling the deck and trap door. The trap door has an arcuate cross-sectional orientation and is adapted to be lowered to a first orientation whereby its exterior edge is essentially at the same height as the lower edge of the deck and raised to a second orientation whereby the entire trap door is above the upper surface of the deck. The side edges of the trap door are formed in an arcuate configuration with the adjacent side wall of the deck also being in an arcuate configuration whereby when the trap is in the first orientation a generally semi-circular exhaust is formed between the deck and trap door whereby cut grass and foliage may be dispersed therethrough to exterior of the deck.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the new and improved lawn mower constructed in accordance with the principles of the present invention.

FIG. 2 is a cross-sectional view taken along line 2—2 of FIG. 1.

FIG. 7 is a top elevational view illustrating an alternate embodiment of the invention.

FIG. 8 is a cross-sectional view taken along line 8—8 of FIG. 7.

The same reference numerals refer to the same parts throughout the various Figures.

DESCRIPTION OF THE PREFERRED EMBODIMENT

Figure 3:
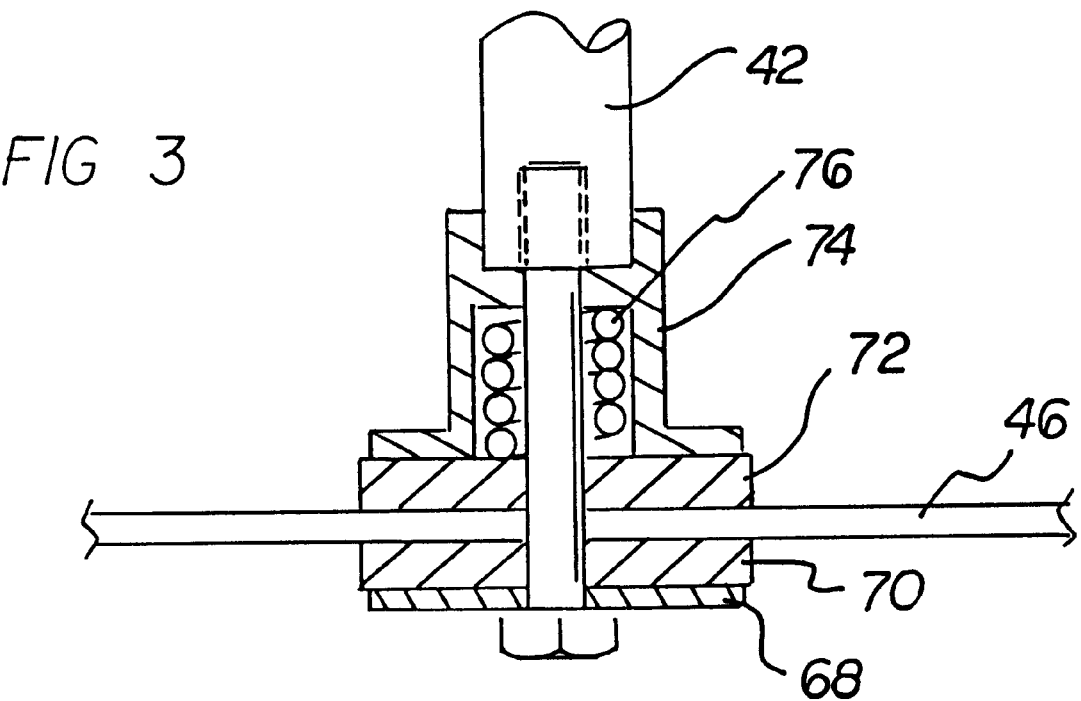
FIGS. 3 and 3A are cross-sectional views taken along line 3—3 of FIG. 2.

With reference now to the drawings, and in particular to FIG. 1 thereof, the preferred embodiment of the new and improved lawn mower system with a deck formed with a trap door embodying the principles and concepts of the present invention and generally designated by the reference numeral 10 will be described.

The present invention, the lawn mower system with a deck formed with a trap door, is comprised of a plurality of components. Such components in their broadest context include a deck, two pair of wheels, a handle, a motor, a rotatable blade, a trap door and a trigger. Such components are individually configured and correlated with respect to each other so as to attain the desired objective.

The present invention is a lawn mower system 10. The lawn mower system includes a deck having a trap door in the front for cutting grass and foliage and operable as a function of the height of the grass and foliage to be cut.

The deck 14 of the system has a generally cylindrical side wall 16. The side wall has a vertical axis. A top wall 18 is coupled to the upper edges of the side wall with an opened bottom 20. The side wall also forms an open front 22 for nearly 180 degrees of its extent.

The lawn mower system also comprises two pair of wheels including a set of front wheels 26. The front wheels are generally centrally located on opposite sides of the side wall. The front wheels extend outwardly from the side wall. A pair of rear wheels 28 extend outwardly from adjacent to the rear edge of the side wall.

In front of each wheel there is preferably provided a pin about ½ inch in diameter which is mounted on the side of the deck to prevent the grass or bush from getting stuck in between the wheels and deck or the grass to tangle on the wheel shaft which would make the whole unit hard to push. It is like a fender.

If the mower is used mainly to cut bushes, it will work better with larger or wider pneumatic rear wheels because it is going to be pushed over the bush stumps.

Also included in the lawn mower system is a handle 32 which has a pivotable lower end 34 coupled with respect to the housing adjacent to the rear edge. The handle has an upper handle area 36 for use by the user.

Further provided in the lawn mower system is a motor 40. The motor is mounted in a central region of the deck with a rotatable drive shaft 42 which extends downwardly therefrom.

Additionally provided is a rotatable blade 46 that is mounted to the lower end of the drive shaft with removable couplings therebetween.

Figure 4:
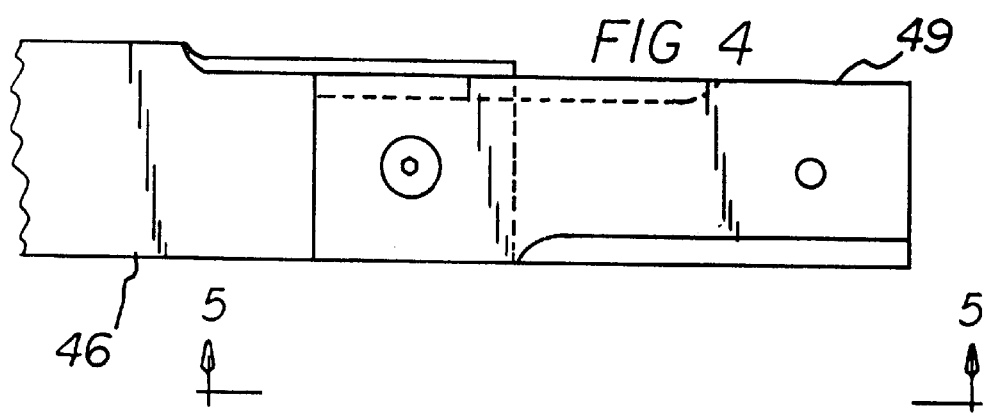
FIG. 4 is a top view of a portion of the blade.
Figure 5:
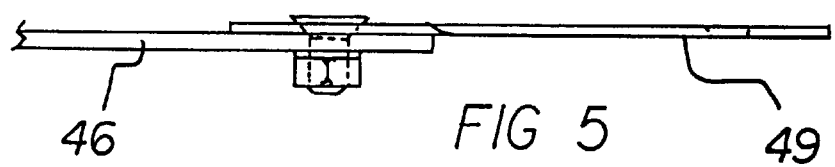
FIG. 5 is a partial side elevational view taken along line 5—5 of FIG. 4.

As shown in FIGS. 4 and 5, the blade 46 includes an extension 49 with cutting edges on both sides. Holes in the blade and extensions with nuts and bolts allow the extension to be readily replaced with either cutting edge being utilized and allowing rotation in either direction.

Figure 6:
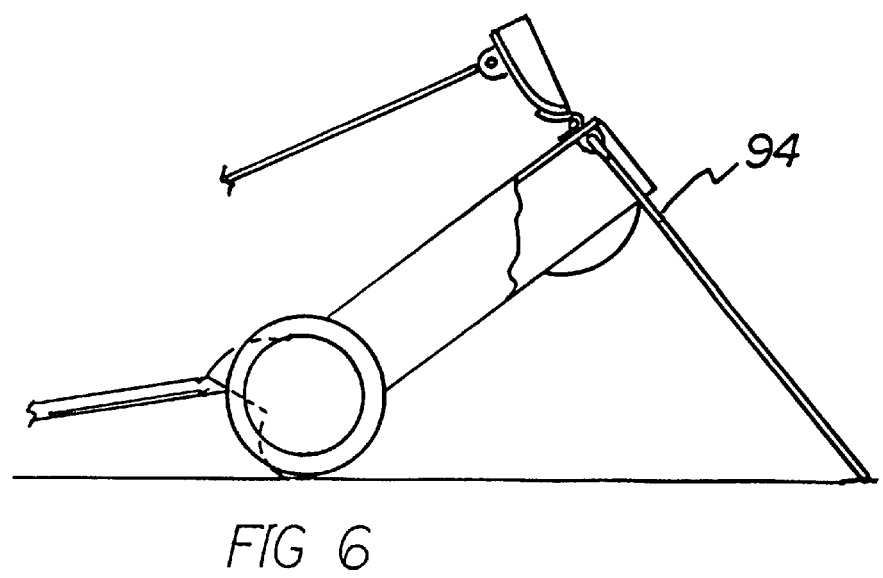
FIG. 6 shows the mower in a tipped orientation.

A supplemental cutter wheel 48 in a circular configuration is also provided in the embodiment of FIGS. 6 and 7. The cutter wheel is located between the upper surface of the deck and the lower end of the drive shaft. The wheel has a pair of diametrically opposed apertures 50 with cutting edges 52 formed therein. An opening 54 in the top wall with a funnel thereabove is adapted to receive material therethrough for being cut and chopped by the cutting edges of the wheel.

The cut of bushes left of the side of the mower can thus be removed with a chipping disk which is made of 3/16" round flat steel, 15" in diameter. On the centerline of the disk at the left and right extreme, about 1/2" from the edge is a rectangular opening 1"×3" where a chipping cutter is fastened with 2 screws. In the center of the disk is fastened with 4 screws a round holder about 1/2" thick and 3" in diameter. With this holder the chipping disk is fastened on the motor shaft with a 5/16" bolt and positioned with a 3/16"×3/16" key above the slipping type blade holder. On the top of the mower deck, next to the motor and 7" from the center of the deck is a 2"×2" opening in a shape of a funnel where the bush can be pushed down. As the disk turns the bush touches the chipping cutter, chipping away the bushes. The cutting blade and the chipper blade can stay mounted on the motor shaft all the time. In the alternative, the cutting blade may be used independent of the chipper blade while the chipper blade may be used independently of the cutting blade. Yet another component of the system is a trap door 56. The trap door has a width essentially equal to the free front upper edge of the deck with a hinge 58 coupling the deck and trap door. The trap door has an arcuate cross-sectional orientation and is adapted to be lowered to a first orientation whereby its exterior edge is essentially at the same height as the lower edge of the deck. The trap door is also adapted to be raised to a second orientation whereby the entire trap door is above the upper surface of the deck for cutting high grass and foliage. The side edges of the trap door are formed in an arcuate configuration with the adjacent side wall of the deck also being in an arcuate configuration whereby when the trap is in the first orientation is a generally semi-circular exhaust 60 is formed between the deck and trap door whereby cut grass and foliage may be dispersed therethrough to exterior of the deck.

Also, to prevent the bushes and tall vegetation from falling on the mower after it has been cut off, on the handle bar bracket there is mounted, with wing nuts, a removable guiding frame which has the front shaped at an angle so it can drive the cut of vegetation and bushes on the side of the mower. By seating the front of the frame parallel with the front wheels and a little bit over the length of the cutting blade, the frame will act as a stop, so it can cut vegetation right up to a wall, fans, tree, when the unit is used like a standard mower, the frame can be removed by removing the wing nuts.

The trap door 56 is operated by a trap door handle mounted on the U-shaped handle functioning as a trigger 64 of the mower connected through a cable 66. When the trap door handle is pulled up, the trap door opens up, exposing clear open part of the cutting blade and also acts like a shield for the motor. When the trap door handle is released, the trap door automatically closes by its own weight. The trap door handle can be operated, if so desired, together with the safety motor kill switch, connected to a separate handle.

The mower is provided with two handles 96, 98 mounted on the deck, one on the front and one in the rear. This is for a comfortable and safe lifting of the unit. Also, the mower is provided with a supporting bar 94 which swings left to right down from under the deck when the trap door is in the open position. Note FIG. 6. One end is fastened to the bottom of the deck with two screws and the other end is held by a hook, also fastened to the deck. This is in the closed position. In the closed position, the supporting bar is parallel with and adjacent to the hinge for the trap door. The purpose of this bar is for supporting the mower in a tilted position on its handle bar and two rear wheels when it is necessary to remove the blade or change the height of the mower by moving the position of the wheels higher or lower. This bar is similar to a hood supporting bar from a car.

Figure 3A:
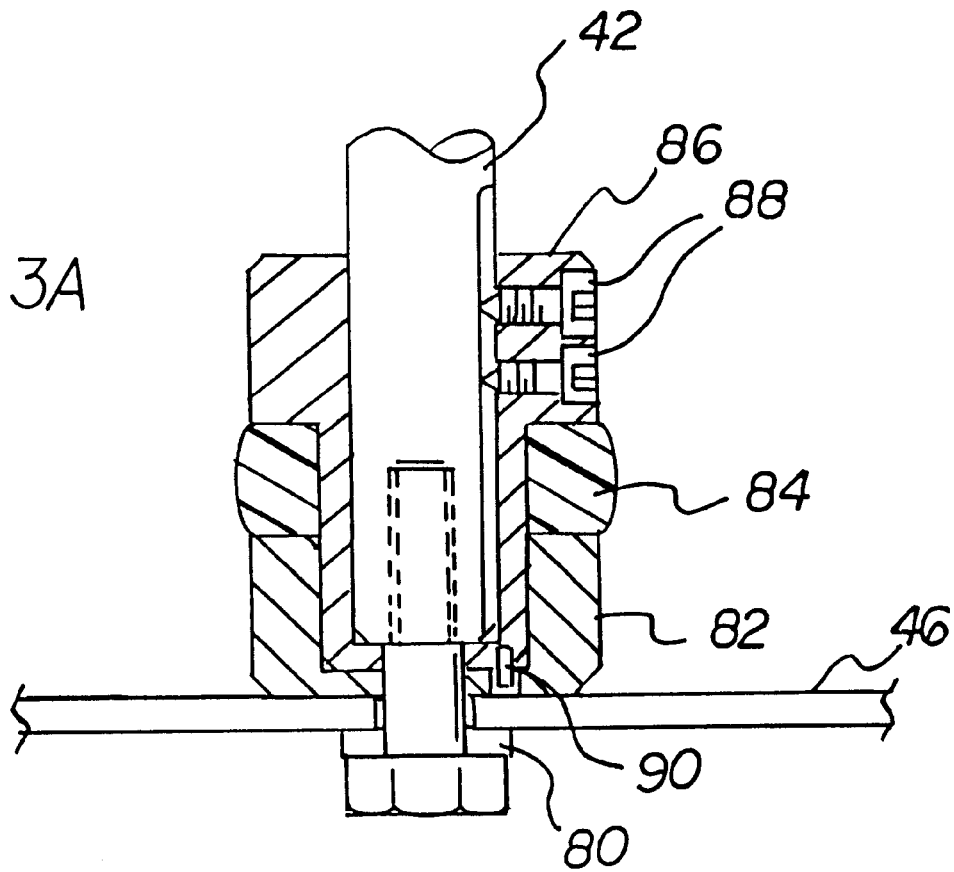

Spring loaded slipping type cutting blade holders are constructed as shown in FIGS. 3 and 3A. In the FIG. 3 embodiment, a round holder 74 holds a covered steel spring 76 which is mounted to the motor shaft with a 3/16" square key. A 1/2" bolt which keeps the mower cutting blade under pressure in between two round flat steel plates 68, 74 and two round flat plates made of a material used on the brakes in the auto industry 70, 72. When the cutting blade hits a rock stamp or anything hard, it slips spinning around in between the round plates rather than putting stress on the motor shaft.

In the FIG. 3A embodiment, the spring 84 is fabricated as a washer of polyurethane. A round steel member 86 with a shoulder is pulled over the motor shaft 42 and is held in place with a 3/8" bolt and two screws 88 which are driven in the key way from the motor shaft preventing it from spinning around. Under the shoulder is pulled on the polyurethane spring 84 which keeps the mower cutting blade under pressure in between a hardened hard chrome plated cup shaped plate 82 and a smaller round hard chromed flat plate 80. The cup shaped plate 82 has a 3/16" hole which goes over a 1/8" pin 90 drilled in the round steel member 86. This pin is to prevent spinning around of the cup shaped plate 82 on the round steel member 86, except for the cutting blade 46. Also without the pin 90, the cup shaped plate 82 would rotate on the polyurethane spring 84. In between the cup shaped plate 82 and the smaller plate 80 must rotate only the cutting blade 46 when hits a hard object. A shear pin 90 will break off when the blade hits a heavy resistance to preclude blade rotation and accidents. It works essentially the same as the primary embodiment described above.

The lawn mower/bush cutter system of the present invention is a standard lawn mower which conveniently and safely cuts tall vegetation, brush and bushes and also chips larger pieces of brush and the like. It is composed of a deck on which is mounted the gasoline motor which is preferably about 3 inches from the centerline towards the front of the deck. It has four wheels. The two front wheels are in line with the front face of the gasoline motor, therefore, the whole front face of the deck can open up in a form of a trap door allowing 3–4 inches from the cutting blade to stick out clearly allowing to cut beside 4 inches of grass, tall vegetation and all kinds of bushes 1/4 to 3/4 inches in diameter and 3–5 feet tall or whatever the power of the motor can handle. The cutting blade is attached to the shaft of the gasoline motor, in the primary embodiment, with a special spring loaded slipping type cutting blade holder which is essential to cut heavy bushes. Without the slipping type blade holder the motor shaft would bind creating vibration on the whole unit and would wear the whole engine prematurely. Note FIG. 1 and 2. The grass discharge chute is part of the trap door situated in the front of the wheels which optionally can be closed. Also optionally on an opening in between the rear wheels a grass discharge shut can be installed fitted with a bag to collect the cut grass.

The lawn mower system of the present invention, unlike typical lawn mowers on the market today, is capable of cutting grass, weeds and small shrubs and also chips larger pieces of brush and the like. A user is able to eliminate other lawn tools by utilizing the lawn mower system of the present invention.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A lawn mower system with discharge components for cutting grass and foliage and operable as a function of the height of the grass and foliage to be cut comprising, in combination:
   a deck having a generally cylindrical side wall with a vertical axis and a sidewall with upper edges and a rear edge and a top wall coupled to the upper edges of the side wall and with an opened bottom, the side wall also forming an open front for nearly 180 degrees of its extent;
   two pair of wheels including a set of front wheels generally centrally located on opposite sides of the side wall and extending outwardly therefrom and a pair of rear wheels extending outwardly from adjacent to the rear edge of the side wall;
   a handle having a pivotable lower end coupled with respect to the housing adjacent to the rear edge and having an upper handle area for use by the user;
   a motor mounted in a central region of the deck with a rotatable drive shaft extending downwardly therefrom;
   a rotatable blade mounted to the lower end of the drive shaft with the blade having a rotary path of travel which extends fowardly of the open front of the housing and with a supplemental cutter wheel in a circular configuration located between the upper surface of the deck and the lower end of the drive shaft, the wheel having a pair of diametrically opposed apertures with cutting edges formed therein;
   an opening in the top wall adapted to receive material therethrough for being cut and chopped by the cutting edges of the wheel;
   a trap door having side edges and having a width essentially equal to the free front upper edge of the deck and essentially equal to the widest part of the housing and with a hinge coupling the deck and trap door, the trap door having an arcuate cross-sectional orientation and adapted to be lowered to a first orientation whereby its exterior edge is essentially at the same height as the lower edge of the deck and raised to a second orientation whereby the entire trap door is above the upper surface of the deck for cutting high grass and foliage, the side edges of the trap door being formed in an arcuate configuration with the adjacent side wall of the deck also being in an arcuate configuration whereby when the trap is in the first orientation a generally semi-circular exhaust is formed between the deck and trap door whereby cut grass and foliage may be dispersed therethrough to exterior of the deck; and
   a trigger mounted on the handle is operatively coupled to the trap door for pivoting the trap door between the raised position and the lower position when in operation and use and further including a bolt to removably couple the blade to the drive shaft with additional means operatively coupling the blade and the drive shaft to allow the blade to cease rotation when it contacts an obstruction.

2. A lawn mower system comprising:
   a deck having a side wall with a vertical axis and a side wall with upper edges and a rear edge and a leading end and a top wall coupled to the upper edges of the side wall and with an opened bottom, the side wall also forming an open front;
   two pair of wheels including a set of front wheels generally centrally located on opposite sides of the side wall and extending outwardly therefrom and a pair of rear wheels extending outwardly from adjacent to the rear edge of the side wall;
   a handle having a pivotable lower end coupled with respect to the housing adjacent to the rear edge and having an upper handle area for use by the user;
   a motor mounted in a central region of the deck with a rotatable drive shaft extending downwardly therefrom;
   a rotatable blade mounted to the lower end of the drive shaft with the blade having a rotary path of travel which extends fowardly of the open front of the housing and with a supplemental cutter wheel in a circular configuration located between the upper surface of the deck and the lower end of the drive shaft, the wheel having a pair of diametrically opposed apertures with cutting edges formed therein;
   a trap door having side edges and having a width essentially equal to the free front upper edge of the deck and essentially equal with a hinge coupling the deck and trap door, the trap door having an arcuate cross-sectional orientation and adapted to be lowered to a first orientation whereby its exterior edge is essentially at the same height as the lower edge of the deck and raised to a second orientation whereby the entire trap door is above the upper surface of the deck for cutting high grass and foliage, the side edges of the trap door being formed in an arcuate configuration with the adjacent side wall of the deck also being in an arcuate configuration whereby when the trap is in the first orientation a generally semi-circular exhaust is formed between the deck and trap door whereby cut grass and foliage may be dispersed therethrough to exterior of the deck and further including a bolt to removably couple the blade to the drive shaft with additional means operatively coupling the blade and the drive shaft to allow the blade to cease rotation when it contacts an obstruction.

3. The lawn mower system as set forth in claim 2 further comprising a trigger mounted on the handle operatively coupled to the trap door for pivoting the trap door between the raised position and the lower position when in operation and use.

4. The lawn mower system as set forth in claim 2 further comprising a supplemental cutter wheel in a circular configuration located between the upper surface of the deck and the lower end of the drive shaft, the wheel having a pair of diametrically opposed apertures with cutting edges formed therein.

5. The lawn mower system as set forth in claim 2 and further comprising an opening in the top wall adapted to receive material therethrough for being cut and chopped by the cutting edges of the wheel.

6. The lawn mower system as set forth in claim 2 wherein the blade has removable extension with cutting edges on both sides.

7. The lawn mower system as set forth in claim 2 and further including a support bar pivotably coupled to the deck adjacent to the leading end and movable between a first orientation within the housing and a second orientation outside of the housing to allow the deck to be held in a tipped position.

8. The lawn mower system as set forth in claim 2 and further including a pair of lifting handles in an inverted U-shaped configuration extending upwardly from the deck.

\* \* \* \* \*